(12) United States Patent
Roet et al.

(10) Patent No.: US 12,725,224 B2
(45) Date of Patent: Sep. 1, 2026

(54) FREQUENCY BASED COLOR MOIRÉ PATTERN DETECTION

(71) Applicant: SAMSUNG ELECTRONICS CO., LTD., Suwon-si (KR)

(72) Inventors: Yotam Roet, Tel-Aviv (IL); Tal Bernstein, Tel-Aviv (IL); Oren Girshkin, Tel-Aviv (IL)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 264 days.

(21) Appl. No.: 18/680,418

(22) Filed: May 31, 2024

(65) Prior Publication Data

US 2025/0371667 A1 Dec. 4, 2025

(51) Int. Cl.

| | |
|---|---|
| ***G06T 5/20*** | (2006.01) |
| ***H04N 19/186*** | (2014.01) |
| ***H04N 25/11*** | (2023.01) |

(52) U.S. Cl.
CPC ............. *G06T 5/20* (2013.01); *H04N 19/186* (2014.11); *H04N 25/11* (2023.01); *G06T 2207/10024* (2013.01); *G06T 2207/20048* (2013.01)

(58) Field of Classification Search
CPC ............. G06T 5/20; G06T 2207/10024; G06T 2207/20048; H04N 19/186; H04N 25/11
See application file for complete search history.

(56) References Cited

U.S. PATENT DOCUMENTS 7,023,576 B1 * 4/2006 Jonsson ................... H04N 1/52 358/1.9
7,256,828 B2 * 8/2007 Nilsson ................ H04N 25/134 382/167
7,277,206 B2 * 10/2007 Trifonov .................. G06T 5/70 358/1.16
7,623,703 B2 * 11/2009 Hahn ...................... H04N 5/21 358/1.9

(Continued)

FOREIGN PATENT DOCUMENTS

CN 109146855 B 3/2021
CN 113129389 A 7/2021

(Continued)

OTHER PUBLICATIONS

Cong Yang et al., "Doing More With Moire Pattern Detection in Digital Photos", Journal of Latex class files, vol. 14, No. 8, Aug. 2021, Published in IEEE Transactions on Image Processing (vol. 32), Jan. 4, 2023, pp. 694-708, DOI: 10.1109/TIP.2022.3232232.

(Continued)

*Primary Examiner* — Manav Seth
(74) *Attorney, Agent, or Firm* — Sughrue Mion, PLLC

(57) ABSTRACT

A method for detecting color moiré in an image, including: obtaining image data corresponding to an input image, wherein the image data comprises chrominance channel data and luminance channel data; applying a frequency transform to the image data to obtain transformed image data; based on the transformed image data, selecting at least one lowest frequency component in the chrominance channel data, and at least one lowest frequency component in the luminance channel data; determining a first magnitude corresponding to the at least one lowest frequency component in the chrominance channel data, and a second magnitude corresponding to the at least one lowest frequency component in the luminance channel data; determining a moiré grade by calculating a ratio of the first magnitude and the second magnitude; and detecting a color moiré artifact in the input image based on the moiré grade.

20 Claims, 10 Drawing Sheets

(56) References Cited

U.S. PATENT DOCUMENTS

| | | | | |
|---|---|---|---|---|
| 9,445,068 | B2 | 9/2016 | Myoga et al. | |
| 9,875,524 | B2 * | 1/2018 | Tatsumi | G06T 3/4092 |
| 10,068,314 | B2 * | 9/2018 | Tatsumi | G06T 3/4092 |
| 11,488,286 | B2 | 11/2022 | Hsiao et al. | |
| 12,579,607 | B2 * | 3/2026 | Kang | G06T 3/4015 |
| 2008/0192139 | A1 * | 8/2008 | Kanai | H04N 23/673<br>348/E5.045 |
| 2023/0164283 | A1 | 5/2023 | Hase | |

FOREIGN PATENT DOCUMENTS

| | | | | |
|---|---|---|---|---|
| CN | 116797583 | A | 9/2023 | |
| EP | 1154636 | A2 * | 11/2001 | H04N 1/52 |
| WO | 2017/012642 | A1 | 1/2017 | |

OTHER PUBLICATIONS

Diogo C. Garcia et al. "Evaluating the effects of image compression in Moiré-pattern-based face-spoofing detection", Proceedings of 2015 IEEE International Conference on Image Processing (ICIP), Sep. 2015, 6 total pages, DOI: 10.1109/ICIP.2015.7351727.

Zhouping Wei et al., "A median-Gaussian filtering framework for Moire pattern noise removal from X-ray microscopy image", Micron, vol. 43, No. 2, Feb. 2012 (Available online Jul. 19, 2011), pp. 170-176, DOI: 10.1016/j.micron.2011.07.009.

Lin Liu et al., "Wavelet-Based Dual-Branch Network for Image Demoireing", Accepted to ECCV 2020, 17 pages, Jul. 17, 2020, arXiv:2007.07173v2 [cs.CV].

Eldho Abraham, "Moire Pattern Detection using Wavelet Decomposition and Convolutional Neural Network", Proceedings of 2018 IEEE Symposium Series on Computational Intelligence (SSCI), Nov. 2018, pp. 1275-1279, DOI: 10.1109/SSCI.2018.8628746.

Denis N. Sidorov et al., "Suppression of moire patterns via spectral analysis", Proceedings of SPIE vol. 4671, Visual Communications and Image Processing 2002, Jan. 4, 2002, pp. 896-906, DOI: 10.1117/12.453134.

Tianyu Gao et al., "Moiré Pattern Removal with Multi-scale Feature Enhancing Network", Proceeding of 2019 IEEE International Conference on Multimedia & Expo Workshops (ICMEW), Jul. 2019, pp. 240-245, DOI: 10.1109/ICMEW.2019.00048.

* cited by examiner

100
Pixel Array
110
PX
CLO_0
CLO_1
CLO_n-1
RSs
RSs
SELSs
Row Driver
140
Controller
120
Lamp Signal
Generator
157
CDS
151
ADC
153
Buffer
155
Readout Circuit
150
IDT
Signal
Processing
Unit
130

501
502
Red
Blue
Green
G0
G1
G2
G3
G4
G5
G6
G7
G8
G9
G10
G11
G12
G13
G14
G15
G
$G = \frac{G0 + G1 + \cdots + G15}{16}$

710

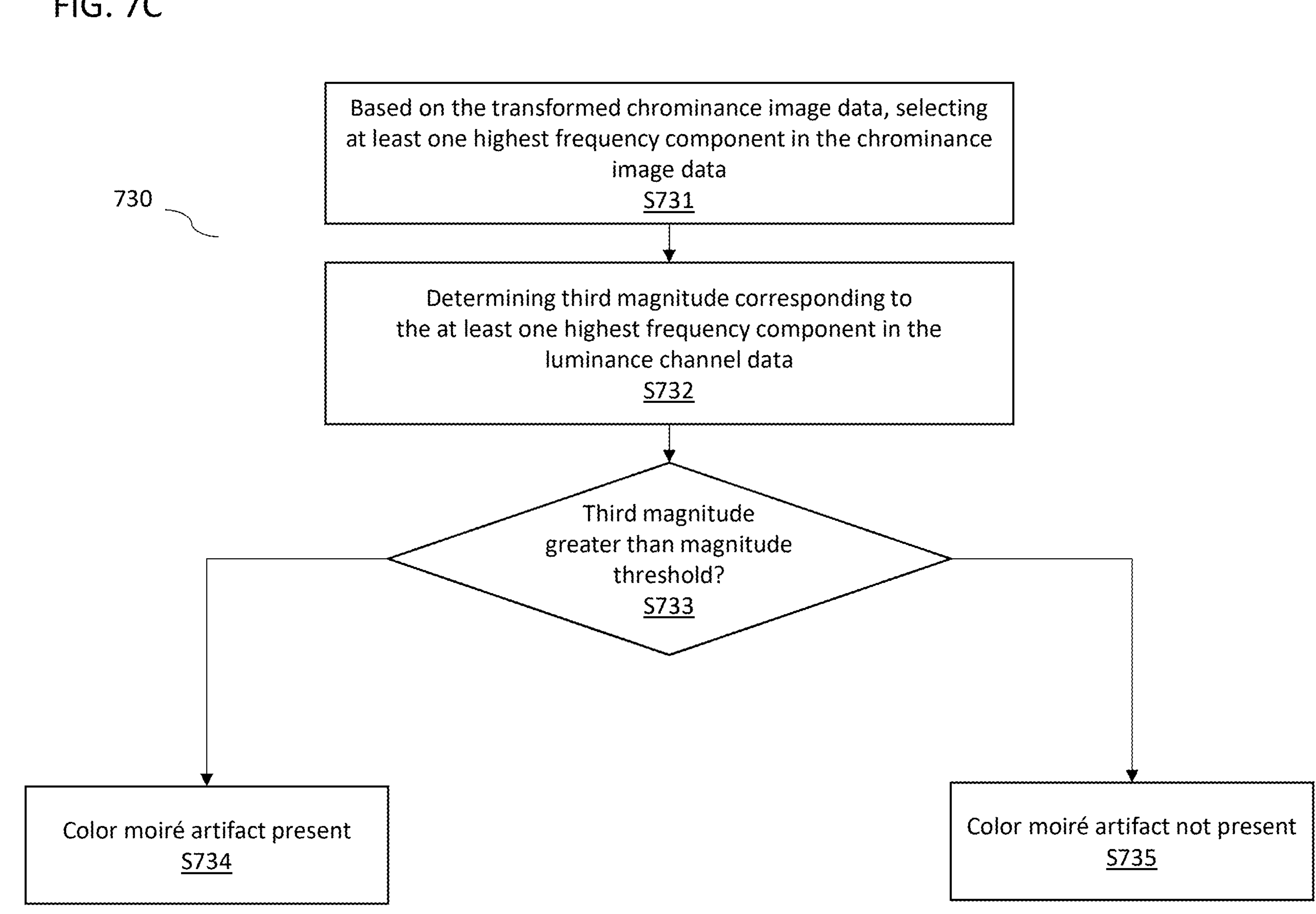
FIG. 7C
730
Based on the transformed chrominance image data, selecting at least one highest frequency component in the chrominance image data
S731
Determining third magnitude corresponding to the at least one highest frequency component in the luminance channel data
S732
Third magnitude greater than magnitude threshold?
S733
Color moiré artifact present
S734
Color moiré artifact not present
S735

FREQUENCY BASED COLOR MOIRÉ PATTERN DETECTION

BACKGROUND

1. Field

The disclosure relates to computer vision and image processing, and more particularly to the detection of color moiré in images.

1. Description of Related Art

Color moiré may refer to an effect or artifact which occurs in images in which at least two-color channels are sampled at different frequencies or locations. For example, in an image sensor, each pixel of the image sensor may be covered by a filter which only allows light having specific wavelengths (e.g., light corresponding to specific colors) to pass. These filters are usually placed in a set, periodic, configuration, called a color filter array (CFA).

To process the outputs of these sensors into an image such as a red-green-blue (RGB) image, each color channel corresponding to a color in the CFA may be interpolated into the desired image size and frequency using a process called demosaicing. This interpolation may cause aliasing artifacts, which may be referred to for example as color moiré artifacts, when the input image includes frequencies on the scale of the frequency of the CFA. The severity of these artifacts may be affected by different sampling frequencies and locations corresponding to the different color channels, which may create noticeable low frequency color modulation patterns on the demosaiced image. The long-range, low-frequency nature of these artifacts may make them very noticeable and also difficult to mitigate.

Some approaches attempt to mitigate the color moiré effect without directly detecting color moiré artifacts. Instead, these approaches may include applying desaturation to high-frequency, colorful areas of the input image. However, this non-specific approach tends to either under-correct or over-correct color in areas affected by the color moiré effect. Other approaches include detecting moiré artifacts using deep neural network classifiers, which may require intensive computational resources, or using simpler classifiers which may be unable able to detect the color moiré effect cause by the frequencies of the CFA.

SUMMARY

Provided are devices and methods for efficiently detecting and correcting color moiré artifacts caused by a color filter array (CFA) pattern.

Additional aspects will be set forth in part in the description which follows and, in part, will be apparent from the description, or may be learned by practice of the presented embodiments.

In accordance with an aspect of the disclosure, a method for detecting color moiré in an image includes: obtaining image data corresponding to an input image, wherein the image data comprises chrominance channel data and luminance channel data; applying a frequency transform to the image data to obtain transformed image data; based on the transformed image data, selecting at least one lowest frequency component in the chrominance channel data, and at least one lowest frequency component in the luminance channel data; determining a first magnitude corresponding to the at least one lowest frequency component in the chrominance channel data, and a second magnitude corresponding to the at least one lowest frequency component in the luminance channel data; determining a moiré grade by calculating a ratio of the first magnitude and the second magnitude; and detecting a color moiré artifact in the input image based on the moiré grade.

In accordance with an aspect of the disclosure, a device for detecting color moiré in an image includes: at least one processor; and a memory configured to store instructions which, when executed by the at least one processor, cause the device to: obtain image data corresponding to an input image, wherein the image data comprises chrominance channel data and luminance channel data; apply a frequency transform to the image data to obtain transformed image data; based on the transformed image data, select at least one lowest frequency component in the chrominance channel data, and at least one lowest frequency component in the luminance channel data; determine a first magnitude corresponding to the at least one lowest frequency component in the chrominance channel data, and a second magnitude corresponding to the at least one lowest frequency component in the luminance channel data; determine a moiré grade by calculating a ratio of the first magnitude and the second magnitude; and detect a color moiré artifact in the input image based on the moiré grade.

In accordance with an aspect of the disclosure, a non-transitory computer-readable medium is configured to store instructions which, when executed by a device for detecting color moiré in an image, cause the device to: obtain image data corresponding to an input image, wherein the image data comprises chrominance channel data and luminance channel data; apply a frequency transform to the image data to obtain transformed image data; based on the transformed image data, select at least one lowest frequency component in the chrominance channel data, and at least one lowest frequency component in the luminance channel data; determine a first magnitude corresponding to the at least one lowest frequency component in the chrominance channel data, and a second magnitude corresponding to the at least one lowest frequency component in the luminance channel data; determine a moiré grade by calculating a ratio of the first magnitude and the second magnitude; and detect a color moiré artifact in the input image based on the moiré grade.

BRIEF DESCRIPTION OF THE DRAWINGS

The above and other aspects, features, and advantages of certain embodiments of the present disclosure will be more apparent from the following detailed description taken in conjunction with the accompanying drawings in which:

FIGS. 7A-7C are flowcharts illustrating examples of a process for detecting color moiré in images, according to embodiments.

DETAILED DESCRIPTION OF THE EMBODIMENTS

Figure 1:
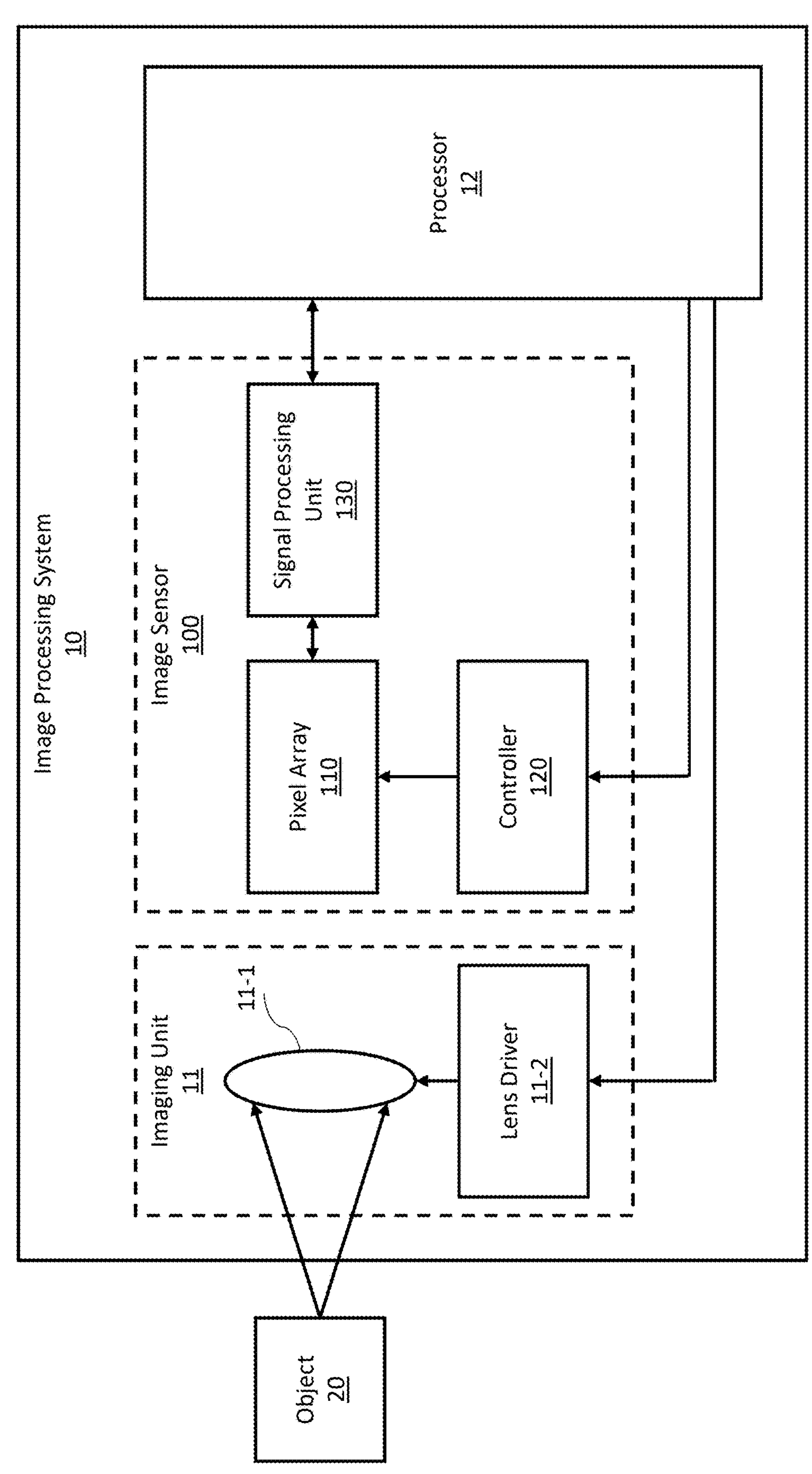
FIG. 1 is a block diagram illustrating an image processing system according to an embodiment.

Hereinafter, embodiments will be described in detail with reference to the accompanying drawings. Like reference numerals in the drawings denote like elements, and redundant or duplicative description thereof may be omitted.

As is traditional in the field, the embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the embodiments may be physically separated into two or more interacting and discrete blocks, units and/or modules without departing from the present scope. Further, the blocks, units and/or modules of the embodiments may be physically combined into more complex blocks, units and/or modules without departing from the present scope.

The term “circuit” used herein may refer to software, or a hardware component such as an FPGA or an ASIC, and “circuit” performs certain roles. However, “circuit” is not limited to software or hardware. The “circuit” may be configured to be on a storage medium that may be addressed, or may be configured to play back one or more processors. Therefore, as an example, “circuit” may include components, such as software components, object-oriented software components, class components, and task components, processes, functions, attributes, procedures, subroutines, segments of program code, drivers, firmware, microcode, circuits, data, databases, data structures, tables, arrays, and variables.

FIG. 1 is a block diagram illustrating an image processing system 10 according to an embodiment. As shown in FIG. 1, the image processing system 10 may include an imaging unit 11, an image sensor 100, and a processor 12. The image processing system 10 may include a focus detection function. In embodiments, the image sensor 100 and the imaging unit 11 may be components included in a camera module.

The image processing system 10 may be implemented as an electronic device that captures an image and displays the captured image or performs an operation based on the captured image. The image processing system 10 may be, or may include, for example, at least one of a personal computer (PC), an Internet of Things (IoT) device, and a portable electronic device. The portable electronic device may include at least one of a laptop computer, a mobile phone, a smartphone, a tablet PC, a personal digital assistant (PDA), an enterprise digital assistant (EDA), a digital still camera, a digital video camera, an audio device, a portable multimedia player (PMP), a personal navigation device (PND), an MP3 player, a handheld game console, an electronic book (e-book), a wearable device, and the like. In addition, the image processing system 10 may be mounted on an electronic device, such as a drone or an advanced drivers assistance system (ADAS), or an electronic device provided as a component in a vehicle, furniture, manufacturing equipment, a door, various types of measurement devices or the like.

The image processing system 10 may further include other components, such as a display and a user interface. The image processing system 10 may be implemented as a system on chip (SoC). Although FIG. 1 illustrates the imaging unit 11, the image sensor 100, the processor 12, and all of the components included therein as being included in a single image processing system 10, embodiments are not limited thereto. For example, in some embodiments one or more of the imaging unit 11, the image sensor 100, the processor 12 may be included in different systems and/or different devices, and one or more of the components illustrated as being included therein, for example one or more of the pixel array 110, the controller 120 and the signal processing unit 130, may be included in different systems and/or different devices The overall operation of the image processing system 10 may be controlled by the processor 12. The processor 12 may provide a lens driver 11-2, a controller 120, and the like with a control signal for an operation of each component. For example, the imaging unit 11 may further include an aperture driver for driving an aperture, and the processor 12 may provide a control signal for controlling the aperture driver. In an embodiment, the processor 12 may be an application processor (AP).

Figure 2:
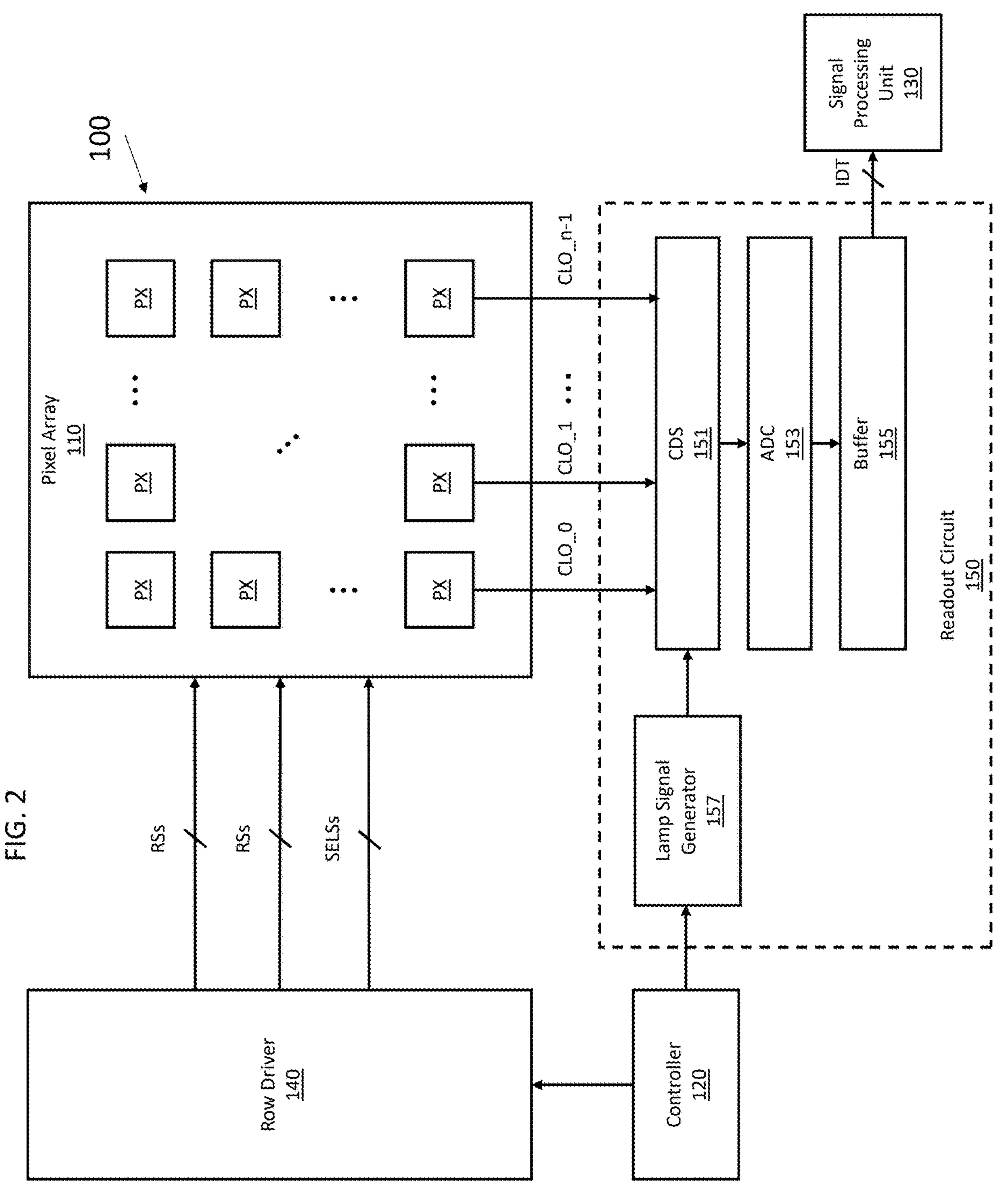
FIG. 2 is a block diagram illustrating a structure of an image sensor according to an embodiment.

The imaging unit 11 may be a component for receiving light, and may include an optical lens 11-1 and the lens driver 11-2. The optical lens 11-1 may include a plurality of lenses. The image sensor 100 may convert, into an electrical signal, a light signal reflected from an object 20 through the optical lens 11-1, and may generate image data, for example image data IDT as shown in FIG. 2, on the basis of electrical signals. Although FIG. 1 illustrates the optical lens 11-1 as including one lens, embodiments are not limited thereto. For example, the optical lens 11-1 may also include a plurality of lenses.

The lens driver 11-2 may communicate information regarding focus detection with the processor 12, and may adjust a position of the optical lens 11-1 according to a control signal provided by the processor 12. The lens driver 11-2 may move the optical lens 11-1 in a direction in which a distance from the object 20 increases or decreases, and accordingly, a distance between the optical lens 11-1 and the object 20 may be adjusted. A focus on the object 20 may be adjusted, which may cause an image of the object 20 to be focused or blurred, according to the position of the optical lens 11-1.

The image sensor 100 may convert incident light into an image signal. The image sensor 100 may include a pixel array 110, a controller 120, and a signal processing unit 130. An optical signal transmitted through the optical lens 11-1 may reach a light receiving surface of the pixel array 110 and form an image of the object 20.

The pixel array 110 may be a complementary metal oxide semiconductor (CMOS) image sensor (CIS) that converts an optical signal into an electrical signal. However, embodiments are not limited thereto, and in some embodiments, the pixel array may include any type of image-capturing sensor.

The sensitivity of the pixel array 110, and/or other parameters of the pixel array 110, may be adjusted by the controller 120. The pixel array 110 may include a plurality of pixels that convert an optical signal into an electrical signal. Each of the plurality of pixels may generate a pixel signal according to a sensed intensity of light.

The processor 12 may reduce noise with respect to input data, and may perform, on the input image, imaging signal processing for image quality improvement, such as gamma correction, color filter array interpolation, color matrix, color correction, and color enhancement. In addition, the processor 12 may generate an image file by compressing image data generated by performing image signal processing for image quality improvement, or may restore image data from the image file.

The pixel array 110 may include a color filter array including color filters configured to allow sensing of various colors, and each of the plurality of pixels may sense a corresponding color. Accordingly, the image sensor 100 may generate output image data including color information. The processor 12 may perform an operation of converting a format of the output image data into full color image data having each of a red color, a green color, and a blue color. In embodiments, the color filter array may have a pattern, which may allow the image sensor 100 may generate output image data having a particular pattern. For example, the color filter array and the output image data may correspond to a pattern such as a Bayer pattern and an N×N Bayer pattern, where N is a natural number greater than one ("1"), but embodiments are not limited thereto.

FIG. 2 is a block diagram illustrating a structure of an image sensor according to an embodiment. Referring to FIG. 2, an image sensor 100 may include a pixel array 110, a controller 120, a signal processing unit 130, a row driver 140, and a readout circuit 150. The readout circuit 150 may include correlated double sampling (CDS) unit 151, an analog-to-digital converter (ADC) 153, and a buffer 155.

The pixel array 110 may convert an optical signal into an electrical signal, and may include a plurality of pixels PX that are two-dimensionally arranged. The plurality of pixels PX may respectively generate pixel signals according to a sensed intensity of light. Each pixel PX may be implemented as, for example, a photoelectric conversion device, such as a charge coupled device (CCD) or CMOS, and may be implemented as various types of photoelectric conversion devices. The pixel array 110 may include a color filter array configured to allow sensing of various colors, and each of the plurality of pixels PX may sense a corresponding color. Examples of color filter arrays are described below with reference to FIG. 3.

The plurality of pixels PX may respectively output pixel signals to the CDS unit 151 through corresponding first to $n^{th}$ column output lines CLO_0 to CLO_n−1. The CDS unit 151 may sample and hold a pixel signal provided from the pixel array 110. The CDS unit 151 may double-sample a level of particular noise (which may be referred to as a reset level), and a level according to an image signal (which may be referred to as an image level), and may output a level corresponding to a difference thereof. In addition, the CDS unit 151 may receive a lamp signal generated by a lamp signal generator 157, and may output a comparison result by comparing the lamp signal with the pixel signal.

The ADC 153 may convert an analog signal corresponding to a level received from the CDS unit 151 into a digital signal. The buffer 155 may latch a digital signal, and the latched digital signal may be sequentially output as image data IDT to the outside of the signal processing unit 130 or the image sensor 100. In embodiments, the output image data IDT may have a pattern corresponding to pattern of the CFA. For example, based on the CFA having a Bayer pattern, the image data IDT may be Bayer pattern image data corresponding to the Bayer pattern. As another example, based on the CFA having an N×N Bayer pattern, the image data IDT may have a pattern corresponding to the N×N Bayer pattern. Examples of color filter arrays having the Bayer pattern and the N×N Bayer pattern are described below with reference to FIG. 3.

The controller 120 may control the row driver 140 so that the pixel array 110 absorbs light to accumulate electric charges, temporarily stores the accumulated electric charges, and outputs an electrical signal according to the stored electric charges to the outside of the pixel array 110. In addition, the controller 120 may control the readout circuit 150 to measure a level of a pixel signal provided by the pixel array 110.

The row driver 140 may generate signals (e.g., reset control signals RSs, transmission control signals TSs, and selection signals SELSs) for controlling the pixel array 110 and provide the signals (e.g., the reset control signals RSs, the transmission control signals TSs, and the selection signals SELSs) to the plurality of pixels PX. The row driver 140 may determine activation and deactivation timings of the reset control signals RSs, the transmission control signals TSs, and the selection signals SELSs provided to the pixels PX.

The signal processing unit 130 may perform signal processing on the received image data IDT output from the readout circuit 150. For example, based on the image data IDT being Bayer pattern image data, the signal processing unit 130 may perform a demosaicing operation on the Bayer pattern image data to generate output image data having a different pattern, for example red-green-blue (RGB) image data having an RGB pattern. In embodiments, demosaicing operation may refer to an operation of interpolating image data having a CFA pattern, such as the Bayer pattern image data, into a full color image, and the RGB image data may be image data of the full color image, in which each pixel of the RGB image data contains information of the red, green and blue colors. As another example, based on the image data IDT having a pattern corresponding to the N×N Bayer pattern, the signal processing unit 130 may perform a binning operation on the image data IDT to generate Bayer pattern image data, and may perform the demosaicing operation on the Bayer pattern image data to generate the RGB image data.

Figure 3:
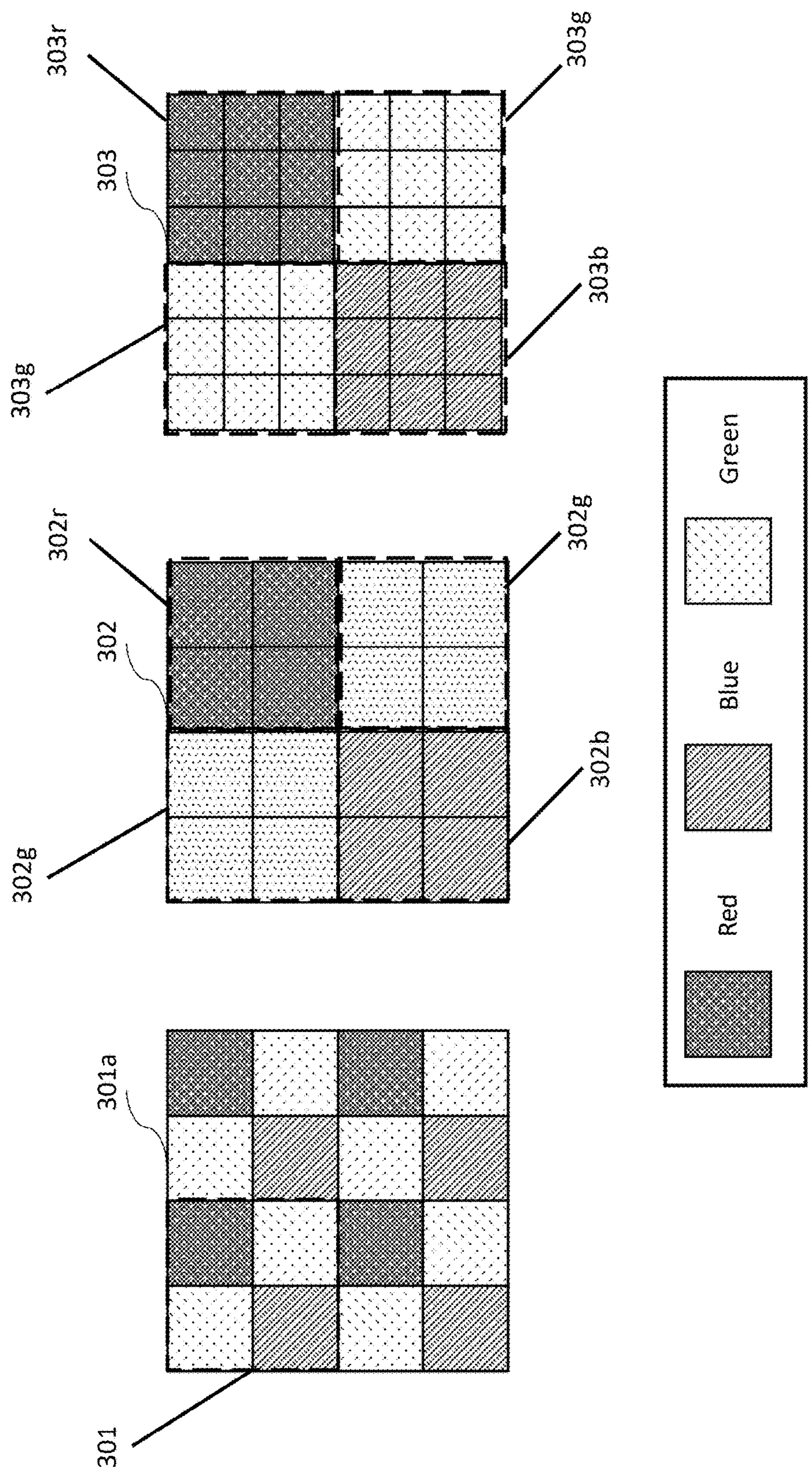
FIG. 3 is a block diagram illustrating examples of color filter array patterns, according to an embodiment.

FIG. 3 is a block diagram illustrating examples of CFA patterns, according to an embodiment. Referring to FIG. 3, each of a CFA pattern 301, a CFA pattern 302, and a CFA pattern 303 may include a plurality of color filters for filtering one of red color light, blue color light, and green color light. In embodiments, each color filter included in the CFA patterns 301, 302, and 303 may be arranged to correspond to a pixel PX discussed above, and may filter the light reaching the corresponding to the pixel PX. As shown in FIG. 3, the CFA pattern 301 may have a Bayer pattern, which may include a periodically repeating block 301*a* including a 2×2 arrangement of one red filter, one blue filter, and two green filters.

In contrast, a CFA pattern 302 and a CFA pattern 302 may have N×N Bayer patterns, in which each color filter of the Bayer pattern is replaced with N×N filters of the same color. For example, CFA 302 may have a 2×2 Bayer pattern, in which each red filter of a Bayer pattern is replaced with a block 302*r* of 2×2 red filters, each blue filter of a Bayer pattern is replaced with a block 302*b* of 2×2 blue filters, and each green filter of a Bayer pattern is replaced with a block 302*g* of 2×2 green filters. As another example, CFA pattern 303 may have a 3×3 Bayer pattern, in which each red filter of a Bayer pattern is replaced with a block 303*r* of 3×3 red filters, each blue filter of a Bayer pattern is replaced with a block 303*b* of 3×3 blue filters, and each green filter of a Bayer pattern is replaced with a block 303*g* of 3×3 green filters. In embodiments, the 2×2 Bayer pattern may be referred to as a Tetra Bayer pattern, the 3×3 Bayer pattern may be referred to as a Nona Bayer pattern, and a 4×4 Bayer pattern may be referred to as a $Tetra^2$ Bayer pattern, but embodiments are not limited thereto.

As discussed above, when image data is captured using an image sensor with a CFA, a demosaicing operation performed on the image data may produce an RGB image which includes moiré artifacts caused by aliasing. Moiré artifacts may refer to large-scale interference patterns which are produced when an opaque ruled pattern with transparent gaps is overlaid on another similar pattern. In embodiments, moiré artifacts may occur when the pattern of the image interferes with the CFA pattern, for example when a frequency of the image pattern is close to a frequency of the CFA pattern. Moiré artifacts may occur in areas of an image corresponding to a relatively low frequency of chroma (e.g., the unwanted pattern) and a relatively high frequency of luma (e.g., the image pattern). According to embodiments, these characteristics may be used to detect moiré artifacts using separate color channels in the frequency domain. Embodiments may allow the moiré artifacts to be directly detected in real-time, but embodiments are not limited thereto.

Although some embodiments are described herein which relate to Bayer patterns and N×N Bayer patterns, embodiments are not limited thereto. For example, embodiments may be used to detect moiré artifacts in image data having any periodic CFA pattern, as well as post-demosaic data (e.g., RGB image data), as long as the CFA pattern frequency is known.

According to embodiments, a moiré detection map may be generated which indicates the detection of moiré artifacts at each location in an image, for example at each pixel included in the image. For example, a moiré grade may be calculated which indicates the level of a moiré effect which may be present at each location in the input image data. In embodiments, a threshold may be used to determine whether the image contains moiré artifacts at each location. To produce the moiré grade, embodiments may calculate luma values and chroma values for each pixel to generate chrominance channel data and luminance channel data, respectively. In embodiments, the luma values and the luminance channel data may refer to representations of the brightness of the image, and the chroma values and the chrominance channel data may refer to representations of the color information of the image. According to embodiments, a frequency transform may be applied separately to each of the chrominance channel and the luminance channel, and the moiré grade may be calculated as a ratio of the lowest frequencies of the chrominance channel (where the moiré artifacts manifest) and the lowest frequencies of the luma channel, which should contain high frequencies (e.g., the image pattern) instead.

Figure 4:
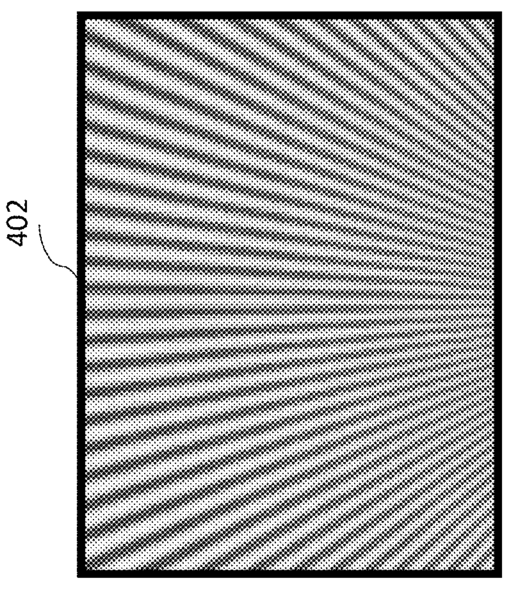
FIG. 4 is a diagram illustrating examples of a color moiré effect, according to an embodiment.
Figure 4:
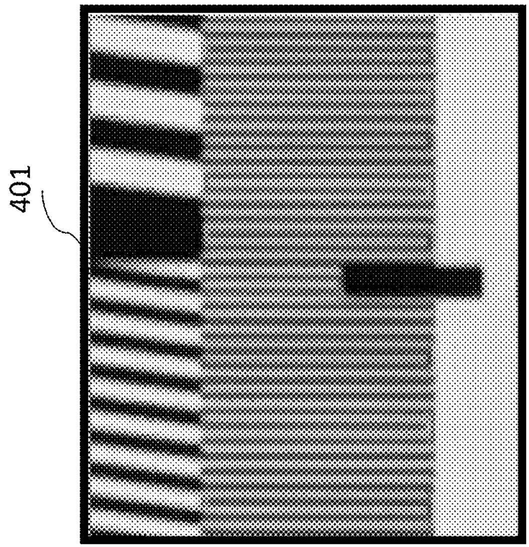

FIG. 4 is a diagram illustrating examples of a color moiré effect, according to an embodiment. A type of a color moiré effect which is present in an image may correspond to geometric angle of the high frequency pattern that causes it. For example, referring to FIG. 4, an image such as image 401 may include horizontal/vertical type color moiré, which may occur in images with high frequency horizontal/vertical lines, and may correspond to color moiré artifacts including a low frequency modulation between chrominance channels, for example a red color channel and a blue color channel. As another example, an image such as image 402 may include diagonal type color moiré, which may occur in images with high frequency diagonal lines, and may correspond to color moiré artifacts including a low frequency modulation between a green color channel and a red+blue color channel. According to embodiments, a different moiré grade may be calculated for each of the two types. In embodiments, although some moiré artifacts may be caused by patterns that do not exactly match the two types shown in FIG. 4, these two types may still be used to effectively detect moiré artifacts in an image.

As discussed above, color moiré detection according to embodiments may be used to detect color moiré artifacts for any CFA pattern, for example a Bayer pattern or an N×N Bayer pattern. When the input image is captured using a CFA having an N×N Bayer pattern, a binning operation may be performed on the image data to generate Bayer pattern image data before the color moiré detection is performed.

Figure 5:
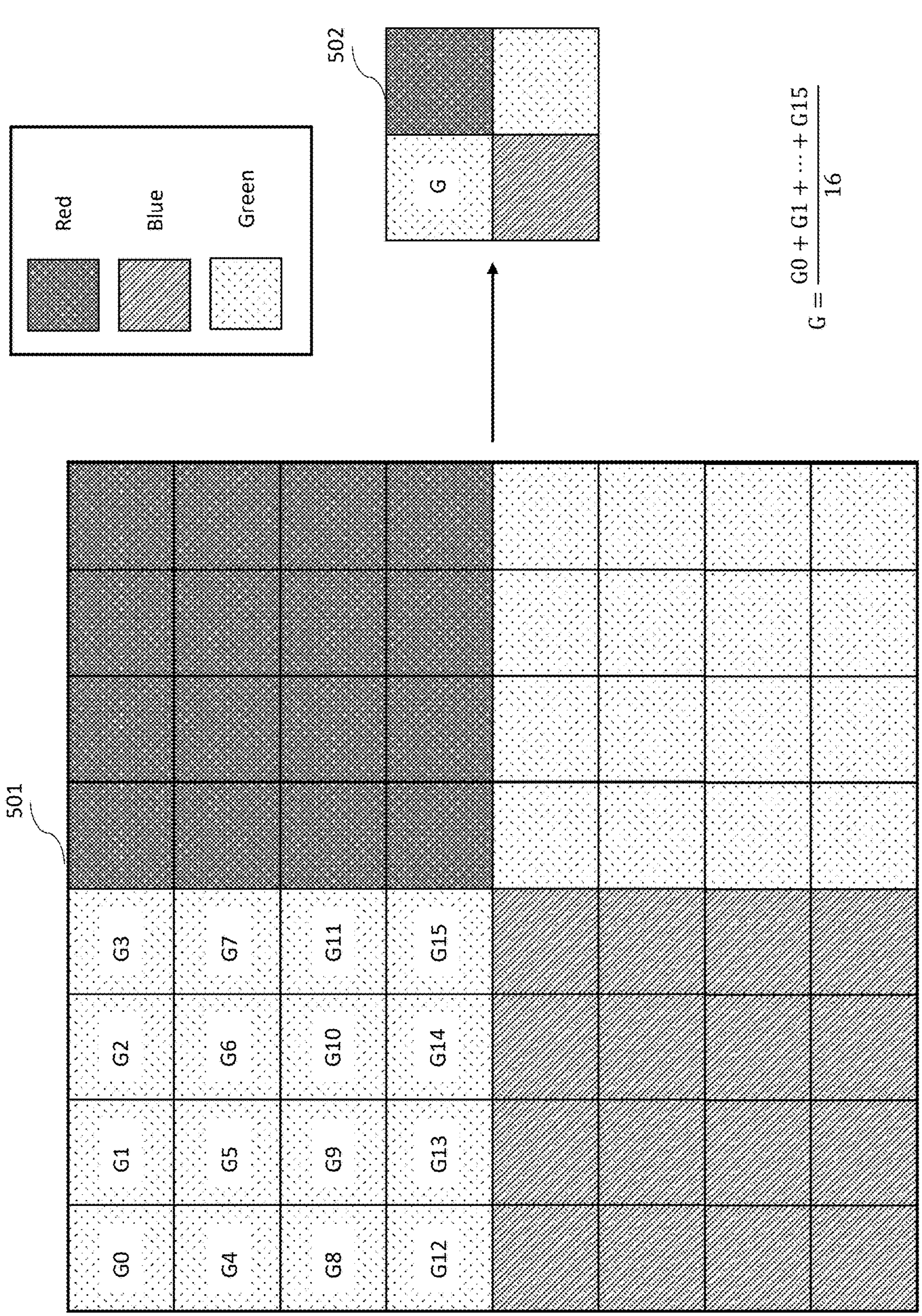
FIG. 5 is a diagram illustrating an example of a binning operation, according to an embodiment.

FIG. 5 is a diagram illustrating an example of a binning operation, according to an embodiment. In embodiments, the binning operation may include calculating the average of the pixel values in each N×N cell of the N×N Bayer pattern image data. The binning operation may result in a single pixel value for each N×N cell, and may therefore produce binned image data which may be smaller than the input image data. For example, as shown in FIG. 5, based on image data generated using a CFA pattern 501 having a 4×4 Bayer pattern, the binning operation may be performed in order to generate binned image data, which may be Bayer pattern image data corresponding to a CFA pattern 502 having a Bayer pattern. For example, during the binning operation, pixel values G0 to G15 corresponding to the CFA pattern 501 may be averaged to generate a pixel value G corresponding to the CFA pattern 502. In embodiments, the binned image data may have a reduced size with respect to a size of the N×N Bayer pattern image data. Accordingly, the binning operation may significantly reduce computational complexity and memory requirements. According to embodiments, if the input image data is Bayer pattern image data, the binning operation may be not performed.

After the Bayer pattern image data is obtained, either directly or by performing binning, the Bayer pattern image data may be demosaiced to obtain RGB image data. In embodiments, the RGB image data may include R channel data corresponding to the color red, G channel data corresponding to the color green, and B channel data corresponding to the color blue.

As discussed above, the moiré effect may be predominantly visible as modulations in two channels, which may correspond to a chrominance representation of the RGB image data. In embodiments, the chrominance representation may include chrominance channel data for the two channels, which may be referred to as C channel data and P channel data. In embodiments, the C channel data may exhibit a strong response to the horizontal/vertical type color moiré, and may be calculated based on the R channel data and the B channel data according to Equation 1 below:

$$C = R - B \quad \text{Equation 1}$$

In addition, the P channel data may exhibit a strong response to the diagonal type color moiré, and may be calculated based on the R channel data, the B channel data, and the G channel data according to Equation 2 below:

$$P = G - \frac{R+B}{2} \quad \text{Equation 2}$$

The image pattern frequency may be primarily visible in luminance channel data, which may be referred to as L channel data corresponding to the chrominance representation, and may be calculated according to Equation 3 below:

$$L = \alpha_G G + \alpha_R R + \alpha_B B \quad \text{Equation 3}$$

In Equation 3, ac may denote a scaling coefficient corresponding to the G channel, $\alpha_R$ may denote a scaling coefficient corresponding to the R channel data, and $\alpha_B$ may denote a scaling coefficient corresponding to the B channel data. In some embodiments, only the green luminance may be used (e.g., $\alpha_G$=1, $\alpha_R$=$\alpha_B$=0), but embodiments are not limited thereto.

After the chrominance channel data and the luminance channel data are obtained, a frequency transform may be applied. In embodiments, the frequency transform may include at least one of a discrete Fourier transform (DFT), a one-dimensional discrete cosine transform (DCT) a two-dimensional DCT, and a wavelet transform, but embodiments are not limited thereto. After the transform is applied, two types of frequencies may be detected in the transformed image data. For example, pattern frequencies $f_{Pattern}$ may refer to frequencies which are closest to the CFA frequency. For example, after the binning operation is performed, the pattern frequencies $f_{Pattern}$ may be the frequencies which are nearest to the Nyquist frequency of the sampling corresponding to the Bayer pattern. When these frequencies are strong in the L channel, this may indicate that color moiré artifacts are present in the input image. In addition, moiré frequencies $f_{Moire}$ may refer to the frequencies of the moiré effect that are most visible on either of the modulated channels (e.g., the C channel and the P channel). The moiré frequencies $f_{Moire}$ may derive from the phase differences between the CFA frequency and the pattern frequencies $f_{Pattern}$. In embodiments, instead of predicting or calculating the moiré frequencies $f_{Moire}$ directly, a set of relatively low frequencies (or for example the lowest frequencies), which may be the frequencies in which the moiré effect is likely to appear, may be summed. When color moiré artifacts are present in the image, a large magnitude may be detected for the moiré frequencies $f_{Moire}$ in the modulated channels (e.g., the C channel and the P channel), and a small magnitude for may be detected for the moiré frequencies $f_{Moire}$ in the L channel.

In embodiments, the frequency transform may applied to the chrominance channel data and the luminance channel data using a relatively small kernel. The size of the kernel may affect the accuracy of the moiré grade for each pixel. This may depend both on the size of the feature causing the moiré effect in the image, and on the moiré frequency $f_{Moire}$. For example, if the moiré frequency $f_{Moire}$ is relatively very low, a larger kernel size might be required to detect it.

In embodiments, the pattern frequencies $f_{Pattern}$ and moiré frequencies $f_{Moire}$ may be calculated separately in different directions. For example, separate frequencies may be calculated for a horizontal direction, a vertical direction, a slash direction (e.g., a forward diagonal direction), and a blash direction (e.g., a backward diagonal direction).

Below is provided an example in which a 9×9 kernel and a one-dimensional DCT are used to detect the frequencies in the horizontal direction. First, the three lowest frequency components for each row in the kernel may be summed, and then the nine sums (one for each row) may be summed to obtain the moiré frequencies $f_{Moire}$ corresponding to the kernel. This process may be performed on the C channel data to obtain the horizontal C channel moiré frequencies $$f^H_{Moire}(C)$$

corresponding to the kernel, may be performed on the P channel data to obtain the horizontal P channel moiré frequencies $$f^H_{Moire}(P)$$

corresponding to the kernel, and may be performed on the L channel data to obtain the horizontal L channel moiré frequencies $$f^H_{Moire}(L)$$

corresponding to the kernel.

Next, the two highest frequency components for each row may be summed, and the nine sums (one for each row) may be summed to obtain the pattern frequencies $f_{Pattern}$ corresponding to the kernel. This process may be performed on the C channel data to obtain the horizontal C channel pattern frequencies $$f^H_{Pattern}(C)$$

corresponding to the kernel, may be performed on the P channel data to obtain the horizontal P channel pattern frequencies $$f^H_{Pattern}(P)$$

corresponding to the kernel, and may be performed on the L channel data to obtain the horizontal L channel pattern frequencies $$f^H_{Pattern}(L)$$

corresponding to the kernel.

In embodiments, similar processes may be performed on the columns of the kernel to obtain the vertical moiré frequencies $$f^V_{Moire}(C),\ f^V_{Moire}(P),\ f^V_{Moire}(L)$$

and the vertical pattern frequencies $$f^{V}_{Pattern}(C),\ f^{V}_{Pattern}(P),\ f^{V}_{Pattern}(L).$$

In embodiments, similar processes may be performed on the kernel in a forward diagonal direction to obtain the slash moiré frequencies $$f^{S}_{Moire}(C),\ f^{S}_{Moire}(P),\ f^{S}_{Moire}(L)$$

and the slash pattern frequencies $$f^{S}_{Pattern}(C),\ f^{S}_{Pattern}(P),\ f^{S}_{Pattern}(L).$$

In embodiments, similar processes may be performed on the kernel in a backward diagonal direction to obtain the blash moiré frequencies $$f^{B}_{Moire}(C),\ f^{B}_{Moire}(P),\ f^{B}_{Moire}(L)$$

and the blash pattern frequencies $$f^{B}_{Pattern}(C),\ f^{B}_{Pattern}(P),\ f^{B}_{Pattern}(L)$$

The moiré grade may be determined for each kernel by dividing the moiré frequencies $f_{Moire}$ in the modulated channels by the moiré frequencies $f_{Moire}$ in the luminance channel. The moiré grade may be determined separately for each direction. In embodiments, different modulated channels may be used to calculate the moiré grade in different directions.

For example, in embodiments the horizontal moiré grade may be calculated according to Equation 3 below:

$$\text{Horizontal Moire Grade} = \frac{f^{H}_{Moire}(C)}{f^{H}_{Moire}(L)} \qquad \text{Equation 3}$$

In embodiments, the vertical moiré grade may be calculated according to Equation 4 below:

$$\text{Vertical Moire Grade} = \frac{f^{V}_{Moire}(C)}{f^{V}_{Moire}(L)} \qquad \text{Equation 4}$$

In embodiments, the slash moiré grade may be calculated according to Equation 5 below:

$$\text{Slash Moire Grade} = \frac{f^{S}_{Moire}(P)}{f^{S}_{Moire}(L)} \qquad \text{Equation 5}$$

In embodiments, the blash moiré grade may be calculated according to Equation 6 below:

$$\text{Blash Moire Grade} = \frac{f^{B}_{Moire}(P)}{f^{B}_{Moire}(L)} \qquad \text{Equation 6}$$

In embodiments, moiré artifacts may only be present when the pattern frequencies $f_{Pattern}$ are relatively high in the L channel. Therefore, in some embodiments the relevant CFA frequency (according to the direction) in luma may be compared with a threshold to determine whether it is high enough. If the CFA frequency is determined to be lower than the threshold, the moiré grade may be set to zero. In addition, embodiments may determine whether a moiré artifact is present for each pixel by comparing its moiré grade to a threshold. Accordingly, embodiments may be used to detect moiré in image data before or after demosaicing is performed.

Figure 6:
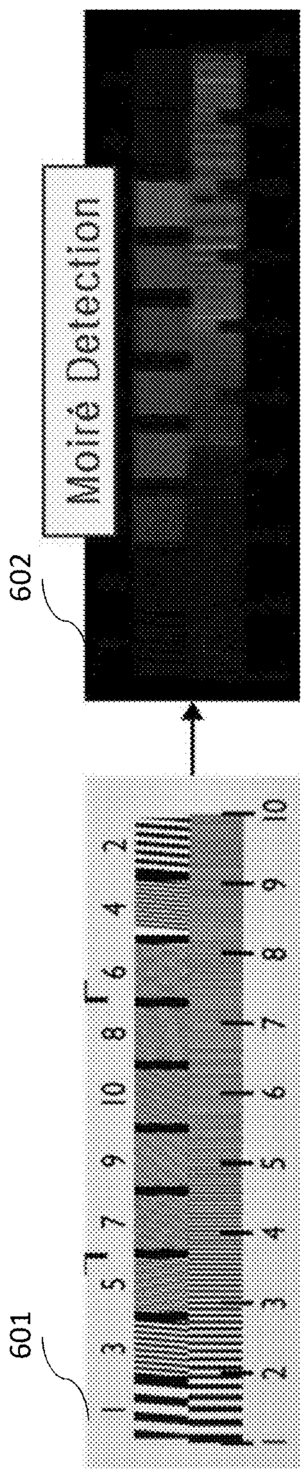
FIG. 6 is a diagram illustrating an example of a moiré detection map, according to an embodiment.

FIG. 6 is a diagram illustrating an example of a moiré detection map, according to an embodiment. Based on an input image 601, a moiré detection map 602 may be generated based on the moiré grades discussed above. For example, in the moiré detection map 602, a brightness of each pixel may indicate a value of a moiré grade corresponding to the pixel, with a higher brightness indicating a higher moiré grade. In embodiments, the moiré detection map 602 may be used to perform image correction on the input image 601 to generate a corrected image in which the effects of the moiré artifacts are reduced.

Figure 7A:
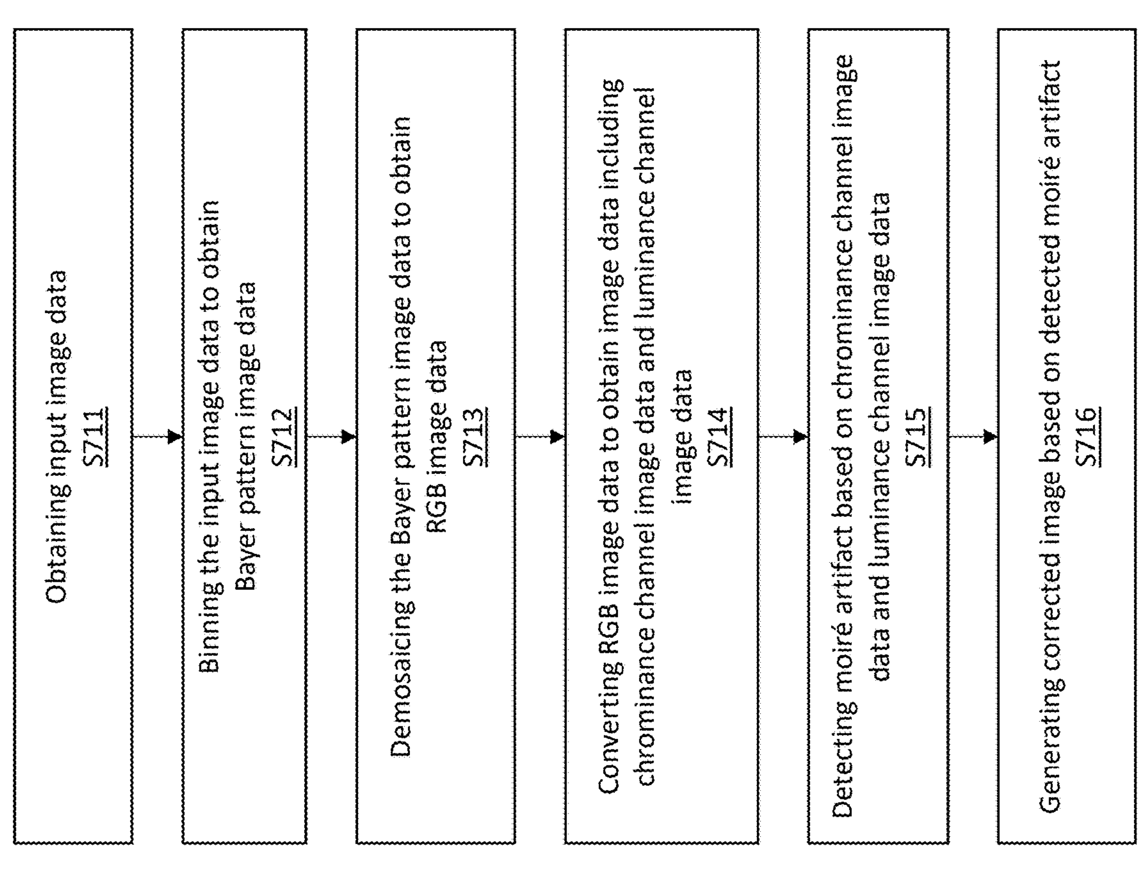

FIG. 7A is a flowchart illustrating an example of a process for detecting color moiré in images, according to embodiments. In some implementations, one or more process blocks of FIG. 7A may be performed by any of the elements discussed above, for example one or more of the image processing system 10, the image sensor 100, and the signal processing unit 130, but embodiments are not limited thereto.

As shown in FIG. 7A, at operation S711 the process 710 may include obtaining input image data. In embodiments, the input image may be captured using an image sensor including a CFA, and the CFA may be arranged in at least one of a Bayer pattern and an N×N Bayer pattern, for example a 2×2 Bayer pattern, a 3×3 Bayer pattern, and a 4×4 Bayer pattern, or any N×N Bayer pattern.

As further shown in FIG. 7A, at operation S712 the process 710 may include performing a binning operation on the input image data to obtain Bayer pattern image data. In embodiments, operation S712 may be performed only on image data corresponding to the N×N Bayer pattern. For example, based on the input image data being Bayer pattern image data corresponding to the Bayer pattern, or RGB image data, operation S712 may be skipped.

As further shown in FIG. 7A, at operation S713 the process 710 may include demosaicing the Bayer pattern image data to obtain RGB image data. In embodiments, based on the input image data being RGB image data, operation S713 may be skipped.

As further shown in FIG. 7A, at operation S714 the process 710 may include converting the RGB image data to obtain image data including chrominance channel data and luminance channel data.

As further shown in FIG. 7A, at operation S715 the process 710 may include detecting a color moiré artifact based on the chrominance channel data and the luminance channel data.

As further shown in FIG. 7A, at operation S716 the process 710 may include generating corrected image data based on the detected color moiré artifact.

In embodiments, the corrected image may be obtained by generating a moiré detection map based on the determined moiré grade, and applying at least one from among desaturation and blurring on image areas of the input image indicated by the moiré detection map as corresponding to the color moiré artifact.

In embodiments, the chrominance channel data may include first chrominance channel data and second chrominance channel data, the first chrominance channel data may be used to determine the moiré grade in at least one of a horizontal direction and a vertical direction, and the second chrominance channel data may be used to calculate the moiré grade in at least one of a forward diagonal direction and a backward diagonal direction. In embodiments, the first chrominance channel data may correspond to the C channel data discussed above, and the second chrominance channel data may correspond to the P channel data discussed above.

In embodiments, the image data may be divided into a plurality of kernels, the moiré grade may be determined for each kernel of the plurality of kernels, and the color moiré artifact may be detected in at least one kernel based on the moiré grade of the at least one kernel.

Figure 7B:
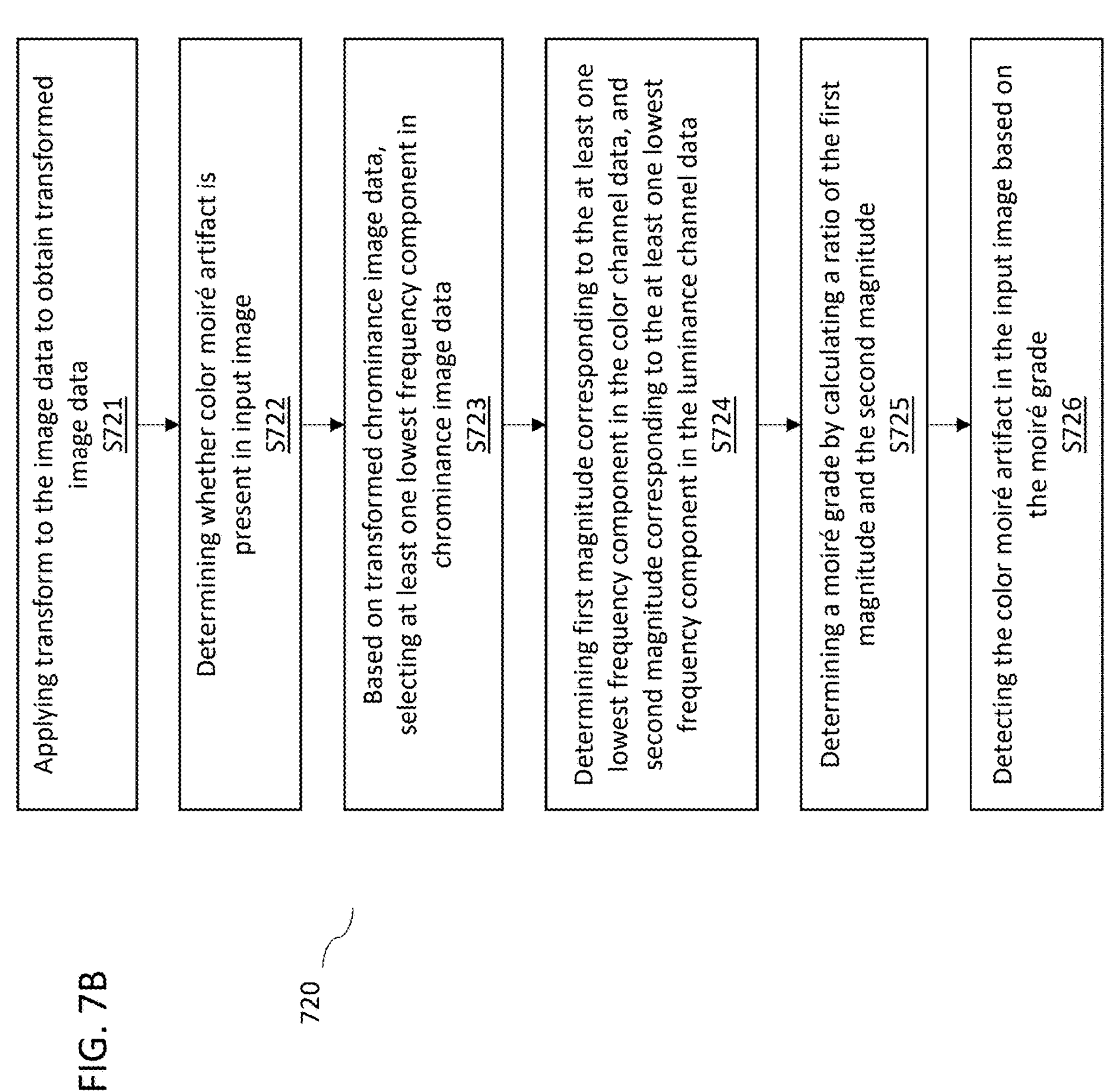

FIG. 7B is a flowchart illustrating an example of a process for detecting color moiré in images, according to embodiments. In some implementations, one or more process blocks of FIG. 7B may be performed by any of the elements discussed above, for example one or more of the image processing system 10, the image sensor 100, and the signal processing unit 130, but embodiments are not limited thereto. In some embodiments, process 720 of FIG. 7B may correspond to operation S715 discussed above, but embodiments are not limited thereto.

As shown in FIG. 7B, at operation S721 the process 720 may include applying a frequency transform to the image data (e.g., the chrominance channel data and the luminance channel data) to obtain transformed image data. In embodiments, the frequency transform may include at least one from among a discrete Fourier transform, a one-dimensional discrete cosine transform, a two-dimensional discrete cosine transform, and a wavelet transform.

As further shown in FIG. 7B, at operation S722 the process 720 may include determining whether a color moiré artifact is likely to be present in the input image.

As further shown in FIG. 7B, at operation S723 the process 720 may include, based on the transformed image data, selecting at least one lowest frequency component in the chrominance channel data, and at least one lowest frequency component in the luminance channel data. However, embodiments are not limited thereto, and frequency components other than the at least one lowest frequency components may be selected, such as relatively low frequency components. For example, in some embodiments, frequency components corresponding to a frequency range from the CFA frequency to about half of the CFA frequency may be referred to as relatively high frequency components, and the relatively low frequency components may correspond to frequencies which are lower than this frequency range. In some embodiments, the relatively low frequency components may correspond to frequencies which are in a lower half of a measureable frequency spectrum.

As further shown in FIG. 7B, at operation S724 the process 720 may include determining a first magnitude corresponding to the at least one lowest frequency component in the chrominance channel data, and a second magnitude corresponding to the at least one lowest frequency component in the luminance channel data. In embodiments, the first magnitude may correspond to the moiré frequency of the chrominance channel data discussed above (e.g., at least one of $f_{Moire}(C)$ and $f_{Moire}(P)$), and the second magnitude may correspond to the moiré frequency of the luminance channel data discussed above (e.g. $f_{Moire}(L)$)

As further shown in FIG. 7B, at operation S725 the process 720 may include determining a moiré grade by calculating a ratio of the first magnitude and the second magnitude.

As further shown in FIG. 7B, at operation S726 the process 720 may include detecting a color moiré artifact in the input image based on the moiré grade.

FIG. 7C is a flowchart illustrating an example of a process for detecting color moiré in images, according to embodiments. In some implementations, one or more process blocks of FIG. 7C may be performed by any of the elements discussed above, for example one or more of the image processing system 10, the image sensor 100, and the signal processing unit 130, but embodiments are not limited thereto. In some embodiments, process 730 of FIG. 7C may correspond to operation S722 discussed above, but embodiments are not limited thereto.

As shown in FIG. 7C, at operation S731 the process 730 may include, based on the transformed image data, selecting at least one highest frequency component in the luminance channel data.

As further shown in FIG. 7C, at operation S732 the process 730 may include determining a third magnitude corresponding to the at least one highest frequency component in the luminance channel data. In embodiments, the third magnitude may correspond to the pattern frequency of the luminance channel (e.g. $f_{Pattern}(L)$).

As further shown in FIG. 7C, at operation S733 the process 730 may include comparing the third magnitude to a threshold magnitude. Based on the third magnitude being greater than or equal to the threshold magnitude (Y at operation S733), the process 730 may include determining that at least one color moiré artifact is likely to be present in the input image at operation S734. Based on the third magnitude being less than the threshold magnitude (N at operation S733), the process 730 may include determining that at least one color moiré artifact is not likely to be present in the input image at operation S735.

Figure 8:
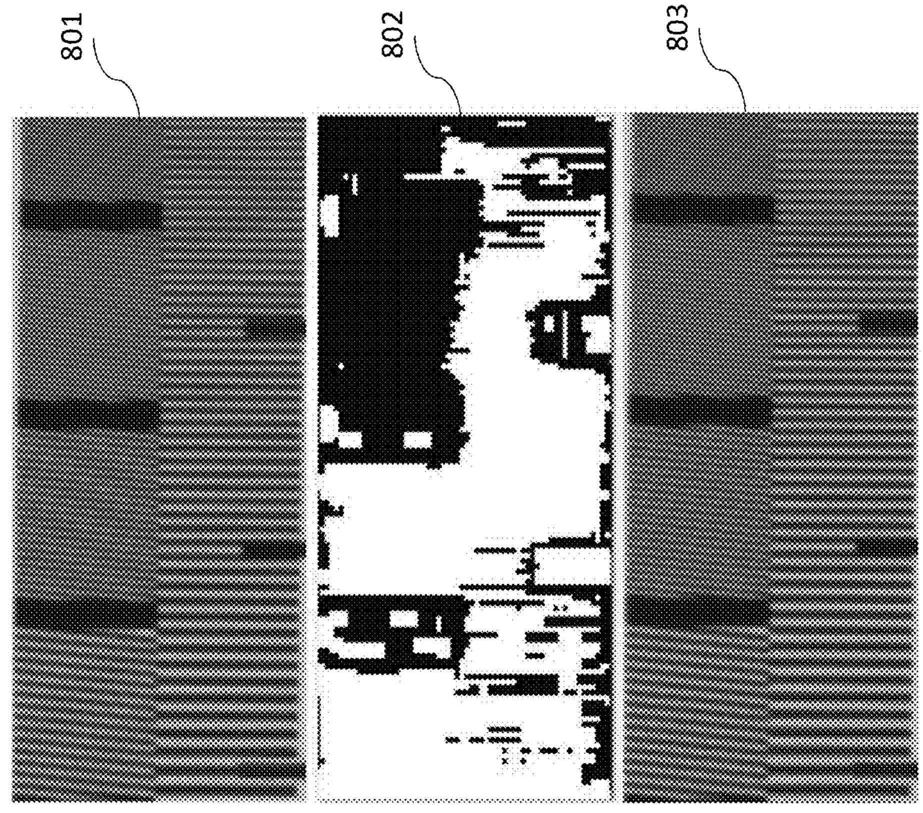
FIG. 8 is a diagram illustrating an example of detecting color moiré artifacts and generating a corrected image, according to embodiments.

FIG. 8 is a diagram illustrating an example of detecting color moiré artifacts and generating a corrected image, according to embodiments. As can be seen in FIG. 8, an RGB image 801 which is generated by demosaicing an input image may include color moiré artifacts. A moiré detection map 802 may be generated according to embodiments, and a corrected image 803 may be generated based on the moiré detection map 802. For example, in some embodiments the corrected image 803 may be generated by applying desaturation on the R channel data and the B channel data (therefore making them closer to the G channel data) in the areas indicated by the moiré detection map 802 as including color moiré artifacts. As another example, in some embodiments the corrected image 803 may be generated by applying blurring in the areas indicated by the moiré detection map 802 as including color moiré artifacts.

As discussed above, some approaches to mitigating the effects of color moiré artifacts (for example those caused by CFA patterns) may involve correcting the color moiré artifacts as part of a larger, false color correction mechanism in which the color moiré artifacts are not directly detected. These approaches may reduce colorfulness in the high frequency and colorful areas of the image. Other approaches may use neural networks to correct color moiré artifacts resulting from differences between the sampling frequency of a camera and a sampled image, for example when taking pictures of an image displayed on a monitor.

However, these approaches are not specific enough for moiré correction, for example for correcting moiré artifacts caused by a CFA pattern. They do not directly detect the color moiré artifacts, use a large enough support for proper detection, or use frequency information about the color moiré artifact's behavior. As a result, they either overcorrect the input image, creating a "bleached" image with substantial color loss in areas where no color moiré artifacts are present, or they fail to correct many of the color moiré artifacts. In addition, the neural network approach to moiré mitigation is computationally expensive, because it requires a deep network with many calculations and a large receptive field (given the low frequency nature of the moiré modulation). Accordingly, neural networks may be unsuitable for most real-time and hardware applications. Furthermore, the neural networks must be specifically trained for different CFA patterns.

In contrast, embodiments of the present disclosure may have several benefits compared to these approaches. For example, embodiments may be specifically tuned to directly detect color moiré artifacts caused by the CFA frequency to produce considerably more accurate results. In addition, embodiments may be performed using a relatively small number of computationally lightweight transform operations and a small support, may be suitable for real-time and hardware applications, and may be adaptable to any periodic CFA pattern.

As a result of these benefits, embodiments may be particularly well-suited for performing moiré artifact correction in image sensors with a periodic CFA. Embodiments may be used to improve the image quality of these sensors, mitigating the effect of many of the moiré artifacts while retaining the colorfulness of the image elsewhere.

The various operations of methods described above may be performed by any suitable means capable of performing the operations, such as various hardware and/or software component(s), circuits, and/or module(s).

The software may include an ordered listing of executable instructions for implementing logical functions, and can be embodied in any "processor-readable medium" for use by or in connection with an instruction execution system, apparatus, or device, such as a single or multiple-core processor or processor-containing system.

The blocks or steps of a method or algorithm and functions described in connection with the embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art.

The foregoing is illustrative of certain embodiments and is not to be construed as limiting thereof. Although a few embodiments have been described, those skilled in the art will readily appreciate that many modifications are possible in the embodiments without materially departing from the present scope.

What is claimed is:

1. A method for detecting color moiré in an image, the method comprising:
- obtaining image data corresponding to an input image, wherein the image data comprises chrominance channel data and luminance channel data;
- applying a frequency transform to the image data to obtain transformed image data;
- based on the transformed image data, selecting at least one lowest frequency component in the chrominance channel data, and at least one lowest frequency component in the luminance channel data;
- determining a first magnitude corresponding to the at least one lowest frequency component in the chrominance channel data, and a second magnitude corresponding to the at least one lowest frequency component in the luminance channel data;
- determining a moiré grade by calculating a ratio of the first magnitude and the second magnitude; and
- detecting a color moiré artifact in the input image based on the moiré grade.

2. The method of claim 1, wherein the chrominance channel data comprises first chrominance channel data and second chrominance channel data,
- wherein the first chrominance channel data is used to determine the moiré grade in at least one of a horizontal direction and a vertical direction, and
- wherein the second chrominance channel data is used to calculate the moiré grade in a diagonal direction.

3. The method of claim 1, wherein the image data is divided into a plurality of kernels,
- wherein the moiré grade is determined for each kernel of the plurality of kernels, and
- wherein the color moiré artifact is detected in at least one kernel based on the moiré grade of the at least one kernel.

4. The method of claim 1, further comprising:
- based on the transformed image data, selecting at least one highest frequency component in the luminance channel data;
- determining a third magnitude corresponding to the at least one highest frequency component in the luminance channel data;
- comparing the third magnitude to a threshold magnitude; and
- based on the third magnitude being greater than the threshold magnitude, determining that the color moiré artifact is present in the input image.

5. The method of claim 1, wherein the input image is captured using an image sensor comprising a color filter array (CFA), and
- wherein the CFA is arranged in at least one of a Bayer pattern and an N×N Bayer pattern, where N is a natural number greater than one.

6. The method of claim 5, further comprising:
- obtaining Bayer pattern image data based on the image data;
- demosaicing the Bayer pattern image data to obtain red-green-blue (RGB) image data; and
- converting the RGB image data to obtain the chrominance channel data and the luminance channel data.

7. The method of claim 6, wherein the CFA is arranged in the N×N Bayer pattern, and
- wherein the Bayer pattern image data is obtained by binning image data corresponding to the N×N Bayer pattern.

8. The method of claim 1, further comprising:
- obtaining a corrected image by applying at least one from among desaturation and blurring on image areas of the input image corresponding to the color moiré artifact.

9. The method of claim 1, wherein the frequency transform comprises at least one from among a discrete Fourier transform, a one-dimensional discrete cosine transform, a two-dimensional discrete cosine transform, and a wavelet transform.

10. A device for detecting color moiré in an image, the device comprising:
at least one processor; and
a memory configured to store instructions which, when executed by the at least one processor, cause the device to:
obtain image data corresponding to an input image, wherein the image data comprises chrominance channel data and luminance channel data;
apply a frequency transform to the image data to obtain transformed image data;
based on the transformed image data, select at least one lowest frequency component in the chrominance channel data, and at least one lowest frequency component in the luminance channel data;
determine a first magnitude corresponding to the at least one lowest frequency component in the chrominance channel data, and a second magnitude corresponding to the at least one lowest frequency component in the luminance channel data;
determine a moiré grade by calculating a ratio of the first magnitude and the second magnitude; and
detect a color moiré artifact in the input image based on the moiré grade.

11. The device of claim 10, wherein the chrominance channel data comprises first chrominance channel data and second chrominance channel data,
wherein the first chrominance channel data is used to determine the moiré grade in at least one of a horizontal direction and a vertical direction, and
wherein the second chrominance channel data is used to calculate the moiré grade in a diagonal direction.

12. The device of claim 10, wherein the image data is divided into a plurality of kernels,
wherein the moiré grade is determined for each kernel of the plurality of kernels, and
wherein the color moiré artifact is detected in at least one kernel based on the moiré grade of the at least one kernel.

13. The device of claim 10, wherein the instructions further cause the device to:
based on the transformed image data, select at least one highest frequency component in the luminance channel data;
determine a third magnitude corresponding to the at least one highest frequency component in the luminance channel data;
compare the third magnitude to a threshold magnitude; and
based on the third magnitude being greater than the threshold magnitude, determine that the color moiré artifact is present in the input image.

14. The device of claim 10, further comprising an image sensor comprising a color filter array (CFA) arranged in a Bayer pattern,
wherein the input image is captured using the image sensor.

15. The device of claim 14, wherein the instructions further cause the device to:
obtain Bayer pattern image data corresponding to the input image;
demosaic the Bayer pattern image data to obtain red-green-blue (RGB) image data; and
convert the RGB image data to obtain the chrominance channel data and the luminance channel data.

16. The device of claim 15, wherein the Bayer pattern comprises an N×N Bayer pattern, where N is a natural number greater an 1, and
wherein the method further comprises binning the Bayer pattern image data, and demosaicing the binned Bayer pattern image data to obtain the RGB image data.

17. The device of claim 10, wherein the instructions further cause the device to:
obtain a corrected image by applying at least one from among desaturation and blurring on image areas of the input image corresponding to the color moiré artifact.

18. The device of claim 10, wherein the frequency transform comprises at least one from among a discrete frequency transform, a one-dimensional discrete cosine transform, a two-dimensional discrete cosine transform, and a wavelet transform.

19. A non-transitory computer-readable medium configured to store instructions which, when executed by a device for detecting color moiré in an image, cause the device to:
obtain image data corresponding to an input image, wherein the image data comprises chrominance channel data and luminance channel data;
apply a frequency transform to the image data to obtain transformed image data;
based on the transformed image data, select at least one lowest frequency component in the chrominance channel data, and at least one lowest frequency component in the luminance channel data;
determine a first magnitude corresponding to the at least one lowest frequency component in the chrominance channel data, and a second magnitude corresponding to the at least one lowest frequency component in the luminance channel data;
determine a moiré grade by calculating a ratio of the first magnitude and the second magnitude; and
detect a color moiré artifact in the input image based on the moiré grade.

20. The non-transitory computer-readable medium of claim 19, wherein the chrominance channel data comprises first chrominance channel data and second chrominance channel data,
wherein the first chrominance channel data is used to determine the moiré grade in at least one of a horizontal direction and a vertical direction, and
wherein the second chrominance channel data is used to calculate the moiré grade in a diagonal direction.

* * * * *